United States Patent
Rasmussen et al.

(10) Patent No.: US 7,747,420 B1
(45) Date of Patent: Jun. 29, 2010

(54) APPARATUS AND METHOD OF SIMULATING THE MOVEMENT OF ELEMENTS THROUGH A REGION OF 3D SPACE

(75) Inventors: Nicholas Grant Rasmussen, San Rafael, CA (US); Ronald Paul Fedkiw, Sunnyvale, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 0 days.

(21) Appl. No.: 12/277,607

(22) Filed: Nov. 25, 2008

Related U.S. Application Data

(63) Continuation of application No. 10/608,935, filed on Jun. 27, 2003, now Pat. No. 7,472,046.

(51) Int. Cl.
*G06G 7/48* (2006.01)
(52) U.S. Cl. .......................... 703/6; 345/473
(58) Field of Classification Search ............... 703/6; 345/473
See application file for complete search history.

(56) References Cited

U.S. PATENT DOCUMENTS

| | | | |
|---|---|---|---|
| 5,537,641 | A | 7/1996 | Da Vitoria Lobo et al. |
| 6,266,071 | B1 | 7/2001 | Stam et al. |
| 2003/0040894 | A1 * | 2/2003 | Miyori et al. ............ 703/6 |

OTHER PUBLICATIONS

Joel H. Ferziger et al., "Computational methods for fluid dynamics", 1997, Springer-Verlag, pp. 35, 56, 312.*
Blinn, J.F., "Light Reflection Functions for Simulation of Clouds and Dusty Surfaces," Computer Graphics vol. 16, No. 3, 1982, pp. 21-29.
Brodie, K. and J. Wood, "Recent Advances in Volume Visualization," Computer Graphics Forum Jan. 20, 2001, pp. 125-148. (Copy of submitted article, pp. 1-23).
Desbrun, M. and M.P. Cani, "Smoothed Particles: A New Paradigm for Animating Highly Deformable Bodies," In Computer Animation and Simulation '96, Proceedings of EG Workshop on Animation and Simulation, Springer-Verglag, R. Boulic and G. Hegron, Eds., pp. 61-76. Published Under the Name Marie-Paule Gascuel.
Dobashi, Y. et al., "A Simple Efficient Method for Realistic Animation of Clouds," In SIGGRAPH 2000 Conference Proceedings, Annual Conference Series, 2000, pp. 19-28.
Ebert, D.S. and R.E. Parent, "Rendering and Animation of Gaseous Phenomena by Combining Fast Volume and Scanline A-Buffer Techniques," In Proceedings of SIGGRAPH 1990, ACM Press/ACM SIGGRAPH, Computer Graphics Proceedings, Annual Conference Series, ACM, 1990, pp. 19-28.

(Continued)

*Primary Examiner*—Paul L Rodriguez
*Assistant Examiner*—Russ Guill
(74) *Attorney, Agent, or Firm*—Fish & Richardson P.C.

(57) ABSTRACT

The movement of elements through a region of three dimensional (3D) space is simulated by utilizing a number of two dimensional (2D) grids to define the region of 3D space. Movement information is associated with each grid point of each 2D grid, and changed over a time period. For each element in 3D space, movement information is interpolated from the grid points of a pair of 2D grids that lie on opposite sides of the element. The interpolated movement information is used to advect the elements through the region of 3D space.

30 Claims, 5 Drawing Sheets

OTHER PUBLICATIONS

Enright, D. et al., "Animation and Rendering of Complex Water Surfaces," In Proceedings of SIGGRAPH 2001, ACM Press/ACM SIGGRAPH, Computer Graphics Proceedings, Annual Conference Series, ACM, 2002, pp. 736-744.

Fedkiw, R. et al., "Visual Simulation of Smoke," In Proceedings or SIGGRAPH 2001, ACM Press/ACM SIGGRAPH, E. Flume, Ed., Computer Graphics Proceedings, Annual Conference Series, ACM, 2001,pp. 15-22.

Foster, N. and D. Metaxas, "Modeling the Motion of a Hot, Turbulent Gas," In Proceedings of SIGGRAPH 1997, ACM Press/ACM SIGGRAPH, Computer Graphics Proceedings, Annual Conference Series, ACM, 1997, pp. 181-188. (Paper, pp. 1-9, only first page numbered).

Foster, N. and D. Metaxas, "Realistic Animation of Liquids," Graphical Models and Image Processing 58, 1996, pp. 471-483. (Paper, pp. 1-24).

Foster, N. and R. Fedkiw, "Practical Animation of Liquids," In Proceedings of SIGGRAPH 2001, ACM Press/ACM SIGGRAPH, Computer Graphics Proceedings, Annual Conference Series, ACM, 2001, pp. 23-30.

Gamito, Manuel Noronha, "Simulation of Turbulent Flow Using Vortex Particles," pp. 1-12 (unnumbered), 1995. Available online at <http://virtual.inesc.pt/virtual/tr/gamito95/artigo.html>.

Gamito, Manuel et al., "Two-dimensional simulation of gaseous phenomena using vortex particles," 1995, from Computer Animation and Simulation '95, Springer-Verlag, 14 pages unnumbered.

Gardner, G.Y., "Visual Simulation of Clouds," In Proceedings of SIGGRAPH, ACM Press/ACM SIGGRAPH, Computer Graphics Proceedings, Annual Conference Series, ACM, 1985, pp. 297-384.

Gingold, R.A. and J.J. Monaghan, "Smoothed Particle Hydrodynamics: Theory and Application to Non-Spherical Stars," Mon. Not. R. Astron, Soc. 181, 1977, pp. 375-389.

Harris, Mark J. et al., "Physically-Based Visual Simulation on Graphics Hardware," Sep. 2002, Proceedings of the ACM SIGGRAPH/EUROGRAPHICS Conference on Graphics Hardware, pp. 109-118 and 160.

Hadap, S. and N. Magnenat-Thalmann, "Modeling Dynamic Hair as a Continuum," Computer Graphics Forum, vol. 20, 2001, No. 3. (Paper, pp. 1-10, unnumbered).

Kajiya, J.T. and B.P. Von Herzen, "Ray Tracing Volume Densities," In Proceedings of SIGGRAPH 1984, ACM/Press/ACM SIGGRAPH, Computer Graphics Proceedings, Annual Conference, ACM, 1984, pp. 165-174.

Lamorlette, A. and N. Foster, "Structure Modeling of Flames for a Production Environment," In Proceedings of SIGGRAPH 2002, ACM Press/ACM SIGGRAPH, Computer Graphics Proceedings, Annual Conference Series, ACM, 2002, pp. 729-735.

Levoy, M., "Display of Surfaces from Volume Data," IEEE Computer Graphics and Applications 8, 3, 1998, pp. 29-37. (Paper pp. 1-10).

Lorensen, W. and H. Cline, "Marching Cubes: A High-Resolution 3D Surface Construction Algorithm," Computer Graphics, vol. 21, No. 4, 1987, pp. 163-169.

Miyazaki et al., "Simulation of Comuliform Clouds Based on Computational Fluid Dynamics," Proc. Eurographics 2002, Short Presentation, 2002, pp. 405-410.

Mueller, K. et al., "Splatting Without the Blur," pp. 1-9, 1999.

Neff, M. and E. Fiume, "A Visual Model for Blast Waves and Fracture," In Proceedings of Graphics Interface 1999, 1999, pp. 193-202 (Paper, pp. 1-10, unnumbered).

Nguyen, D., "Physically Based Modeling and Animation of Fire," In Proceedings of SIGGRAPH 2002, ACM Press/ACM SIGGRAPH, Computer Graphics Proceedings, Annual Conference, ACM, 2002, pp. 721-728.

O'Brien, J.F. and J.K. Hodgins, "Graphical Modeling and Animation of Brittle Fracture," In Proceedings of SIGGRAPH 1999, ACM Press/ACM SIGGRAPH, Computer Graphics Proceedings, Annual Conference Series, ACM, 1999, pp. 137-146.

Perlin, K., "An Image Synthesizer," In Proceedings of SIGGRAPH 1985, ACM Press/ACM SIGGRAPH, Computer Graphics Proceedings, Annual Conference Series, ACM, 1985, pp. 278-296, vol. 19, No. 3.

Rudolf, M.J., and J. Raczkowski, "Modeling the Motion of Dense Smoke in the Wind Field," Computer Graphics Forum, vol. 19, No. 3, 2000.

Sakas, G., "Fast Rendering of Arbitrary Distributed Volume Densities," In Proceedings of Eurographics, 1990, pp. 519-530.

Sakas, G., "Modeling and Animating Turbulent Gaseous Phenomena Using Spectral Synthesis," The Visual Computer 9, 1993, pp. 200-212.

SIGGRAPH 2002 Course 9, pp. 1-1 thru 7-31, with attention to J. Tessendorf, "Simulating Ocean Water," pp. 3-1 thru 3-19 plus 44 page chart presentation, "Simulating Ocean Surfaces" (pages not numbered).

Sims, K., "Particle Animation and Rendering Using Data Parallel Computation," Computer Graphics vol. 24, No. 4, 1990, pp. 405-413.

Stam, J. et al., "Depicting Fire and Other Gaseous Phenomena Using Diffusion Processes," In Proceedings of SIGGRAPH 1995, ACM Press/ACM SIGGRAPH, Computer Graphics Proceedings, Annual Conference Series, ACM, 1995, pp. 129-136 (Unnumbered).

Stam, J., "Stable Fluids," In SIGGRAPH 99 Conference Proceedings, Annual Conference Series, ACM Press/ACM SIGGRAPH, Computer Graphics Proceedings, Annual Conference Series, ACM, 1999, pp. 121-128.

Stam, J. and E. Flume, "Turbulent Wind Fields for Gaseous Phenomena," In Proceedings of SIGGRAPH 1993, ACM Press/ACM SIGGRAPH, Computer Graphics Proceedings, Annual Conference Series, ACM, 1993, pp. 369-376. (Paper, pp. 1-7, unnumbered).

Steinhoff, J. and D. Underhill, "Modification of the Euler Equations for "Vorticity Confinement," Application to the Computation of the Interacting Vortex Rings," Physics of Fluids 6, 8, 1994, pp. 2738-2744.

Szeliski, R. and D. Tonnesen, "Surface Modelings with Oriented Particle Systems," Computer Graphics, SIGGRAPH Proc., 1992, pp. 185-194.

Tessendorf, J. "Simulating Ocean Water," In Simulating Nature: Realistic and Interactive Techniques, SIGGRAPH, 2002, Course Notes 9, pp. 1-1 thru 7-31.

Wejchert, J. and Haumann, "Animation Aerodynamics," Computer Graphics, vol. 25, No. 4, 1991, pp. 19-22.

Westover, L., Numerical Design Limited, "Footprint Evaluation for Volume Rendering," Computer Graphics, vol. 24, No. 4, Aug. 1990, pp. 367-376.

Wyvill, B. et al., "Animating Soft Objects," The Visual Computer V. 2(4), 1985, pp. 235-242.

Yaeger, L. and C. Upson, "Combining Physical and Visual Simulation—Creation of the Planet Jupiter for the Film 2010," In Proceedings of SIGGRAPH 1986, ACM Press/ACM SIGGRAPH, Computer Graphics Proceedings, Annual Conference Series, ACM, 1986, pp. 85-93.

Yugve, G. et al., "Animating Explosions," In Proceedings of SIGGRAPH 2000, ACM Press/ACM SIGGRAPH, Computer Graphics Proceedings, Annual Conference Series, ACM, 2000, pp. 29-36.

Landau, L.D. and E.M. Lifshitz, "Fluid Mechanics," $2^{nd}$ Edition, Butterworth-Heinermann, Oxford, 1998.

* cited by examiner

APPARATUS AND METHOD OF SIMULATING THE MOVEMENT OF ELEMENTS THROUGH A REGION OF 3D SPACE

CLAIM OF PRIORITY

This application is a continuation application and claims priority under 35 USC §120 to U.S. patent application Ser. No. 10/608,935, filed on Jun. 27, 2003, now U.S. Pat. No. 7,472,046, the entire contents of which are hereby incorporated by reference.

BACKGROUND OF THE INVENTION

1. Field of the Invention

The present invention relates to simulation and, more particularly, to an apparatus and method of simulating the movement of elements through a region of 3D space.

2. Description of the Related Art

Although numerical simulations are now routinely used in the special effects industry, it is difficult to simulate the movement of elements through large regions of 3D space in an economical manner. Thus, there is a need for a method and an apparatus of simulating the movement of elements through a region of 3D space.

SUMMARY OF THE INVENTION

The present invention provides a method of simulating the movement of elements through space. The method includes the steps of generating a plurality of 2D grids where each 2D grid has a plurality of grid points, and associating movement information with each 2D grid point.

The method also includes the step of changing the movement information associated with the 2D grid points over a time period that includes a series of time steps. Further, the method includes the steps of defining a region of 3D space using the 2D grids, and advecting the plurality of elements through the region of 3D space using the movement information associated with the 2D grids.

The present invention also provides a method of advecting elements through space. The method includes the step of generating a plurality of 2D grids where each 2D grid has a plurality of grid points, and each grid point has movement information. The method also includes the steps of defining a region of 3D space using the 2D grids, and generating a plurality of elements in the region of 3D space where each element has a location.

For each element, the method also includes the step of determining movement information for an element based on the location of the element in the region of 3D space. The determining step includes the steps of identifying points on the 2D grids that lie on both sides of the element at the location in the region of 3D space, and determining movement information at the points on the 2D grids. Further, the method includes the step of interpolating between the movement information at the points on the 2D grids to determine element movement information for the element at the location in 3D space.

The present invention also includes an apparatus for simulating the movement of elements through space. The apparatus includes means for generating a plurality of 2D grids where each 2D grid having a plurality of grid points, and means for associating movement information with each 2D grid point. The apparatus also includes means for changing the movement information associated with the 2D grid points over a time period that includes a series of time steps. In addition, the apparatus includes means for defining a region of 3D space using the 2D grids, and means for advecting the plurality of elements through the region of 3D space using the movement information associated with the 2D grids.

A better understanding of the features and advantages of the present invention will be obtained by reference to the following detailed description and accompanying drawings that set forth an illustrative embodiment in which the principles of the invention are utilized.

DETAILED DESCRIPTION OF THE INVENTION

Figure 1:
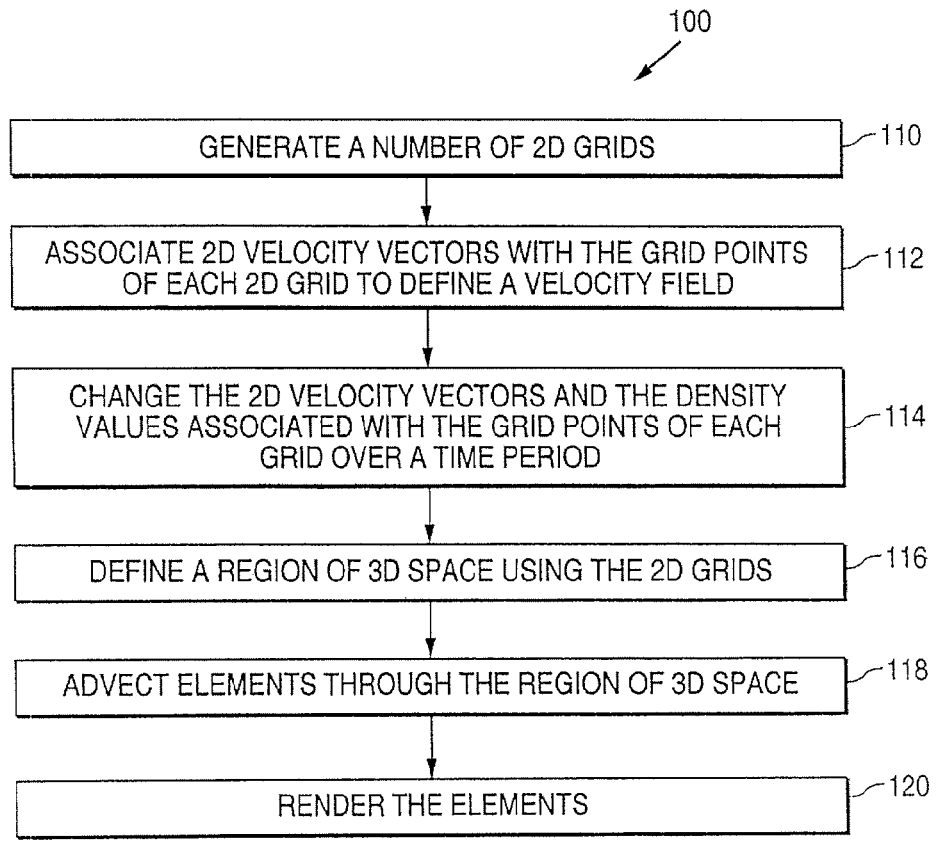
FIG. 1 is a flow chart illustrating an example of a method 100 of simulating smoke for large scale phenomena in accordance with the present invention.

FIG. 1 shows a flow chart that illustrates an example of a method 100 of simulating smoke for large scale phenomena in accordance with the present invention. As described in greater detail below, the present invention simulates smoke by injecting elements into a region of 3D space defined by a number of 2D grids, and passively advecting the injected elements through the region of 3D space.

As shown in FIG. 1, method 100 begins at step 110 by generating a number of 2D grids. Each 2D grid, in turn, has a number of grid points. Following this, method 100 moves to step 112 to associate 2D velocity vectors and density values with the grid points of each 2D grid. The 2D velocity vectors define a velocity field, such as a wind field, where each 2D velocity vector represents the total velocity forces that are acting on a grid point. In the present example, temperature values are also associated with the grid points.

Next, method 100 moves to step 114 to change the 2D velocity vectors and the density values that are associated with the grid points of the 2D grids over a time period that includes a series of time steps. As a result, at each time step, the 2D velocity vectors and density values of the 2D grids represent the changes that have occurred up to the time step.

The 2D velocity vectors and the density values that are associated with the grid points of a grid can be changed over the time period in any way. One way of changing the 2D velocity vectors and density values that are associated with the grid points of a grid is to mimic the changes experienced by a continuous, incompressible 2D fluid when a force is applied to the fluid over the time period.

When force is applied to an incompressible 2D fluid, the fluid moves. The movement of the 2D fluid can be described by placing a grid over the fluid, and associating 2D velocity vectors and density values with the grid points of the grid. The 2D velocity vectors and density values at the grid points change over time to describe the direction and speed of the fluid as the fluid moves past the grid points.

Thus, the 2D velocity vectors and density values associated with the grid points of the grids generated in step 110 can be defined by the velocity vectors and density values that describe the direction and speed of an incompressible 2D fluid as the fluid moves past the grid points.

When a force is applied to a continuous, incompressible 2D fluid, the movement of the fluid is described by fluid dynamics. For example, the changes to the 2D velocity vectors that take place over time as the fluid moves can be approximated mathematically with the 2D incompressible Euler equations as shown in EQs. 1 and 2:

$$\nabla \cdot u = 0 \qquad \text{EQ. 1}$$

$$u_{t_1} = -(u \cdot \nabla)u - \nabla p + f \qquad \text{EQ. 2}$$

where p is the pressure of the fluid (or gas), and f accounts for the external forces. In addition, the constant density has arbitrarily been set to one.

EQ. 1 states the requirement for incompressibility, i.e., that a force applied to the fluid in one area causes the fluid to move in another area due to the incompressible nature of the fluid. EQ. 2 defines how an incompressible fluid changes over time when a force is applied. EQ. 2 is solved by first computing an intermediate velocity (u=u*$\Delta$t$\nabla$p) ignoring the pressure term p, and then adding the pressure correction term using u=u+−$\Delta$t p where the pressure p is found by solving $\nabla^2 p = \nabla \cdot u^*/\Delta t$.

A semi-Lagrangian stable fluids approach can be utilized to find the intermediate velocity u* and solve the linear system of equations for the pressure using a preconditioned conjugate gradient method as described in Stam, J., *Stable Fluids*, In SIGGRAPH 99 Conference Proceedings, Annual Conference Series, ACM Press/ACM SIGGRAPH, Computer Graphics Proceedings, Annual Conference Series, ACM, 1999, pp. 121-128 and Fedkiw, R. et al., *Visual Simulation of Smoke*, In Proceedings of SIGGRAPH 2001, ACM Press/ACM SIGGRAPH, E. Fiume, Ed., Computer Graphics Proceedings, Annual Conference Series, ACM, 2001, pp. 15-22 which are hereby incorporated by reference.

The density and temperature of the fluid are passively convected by the velocity field, $T_1 = -(u \cdot \nabla)T$ and $p_t = -(u \cdot \nabla p)$. As a result, both can be solved for using the semi-Lagrangian stable fluids method. In the present example, the movement of an incompressible 2D fluid is used to model the movement of smoke.

Heavy smoke tends to fall downwards due to gravity, while hot gases tend to rise due to buoyancy. Although temperature is not accounted for (only using it for rendering), the external buoyancy force is directly proportional to the density, $f_{buoy} = -apz$ where $z=(0,1)$ points in the upward vertical direction and a is a positive constant with appropriate units.

In addition, nonphysical numerical dissipation is used to damp out interesting flow features. Vorticity confinement is used to generate swirling effects as described by Steinhoff, J. and Unherhill, D., *Modification of the Euler Equations for "Vorticity Confinement": Application to the Computation of Interacting Vortex Rings*, Physics of Fluids, 6, 8, 1994, pp. 2738-2744, Fedkiw, R. et al., *Visual Simulation of Smoke*, In Proceedings of SIGGRAPH 2001, ACM Press/ACM SIGGRAPH, E. Fiume, Ed., Computer Graphics Proceedings, Annual Conference Series, ACM, 2D01, pp, 15-22 and Nguyen, D. et al., *Physically Based Medeling and Animation of Fire*, In Proceedings of SIGGRAPH 2002, ACM Press/ACM SIGGRAPH, Computer Graphics Proceedings, Annual Conference Series, ACM, 2002, pp. 721-728 which are hereby incorporated by reference.

First the vorticity $\omega = \nabla \cdot u$ is identified as the ("paddle-wheel") source of this small scale structure, and then normalized vorticity location vectors, $N = \nabla|\omega|/\nabla\omega\|$ that point from lower to higher concentrations of vorticity are constructed. The magnitude and direction of the vorticity confinement force is computed as $f_{conf} = \epsilon h(N \cdot \omega)$ where $\epsilon > 0$ and is used to control the amount of small scale detail added back into the flow, and the dependence on the grid size h guarantees that the physically correct solution is obtained as the mesh is refined.

Returning to FIG. 1, after the 2D velocity vectors and density values associated with the grid points of each 2D grid have been changed over the time period, method 100 moves to step 116 to define a region of 3D space using the 2D grids. The region of 3D space can take any shape. For example, the 2D grids can be used to define a rectangular, a cylindrical, a square, or a serpentine region of 3D space.

Figure 2A:
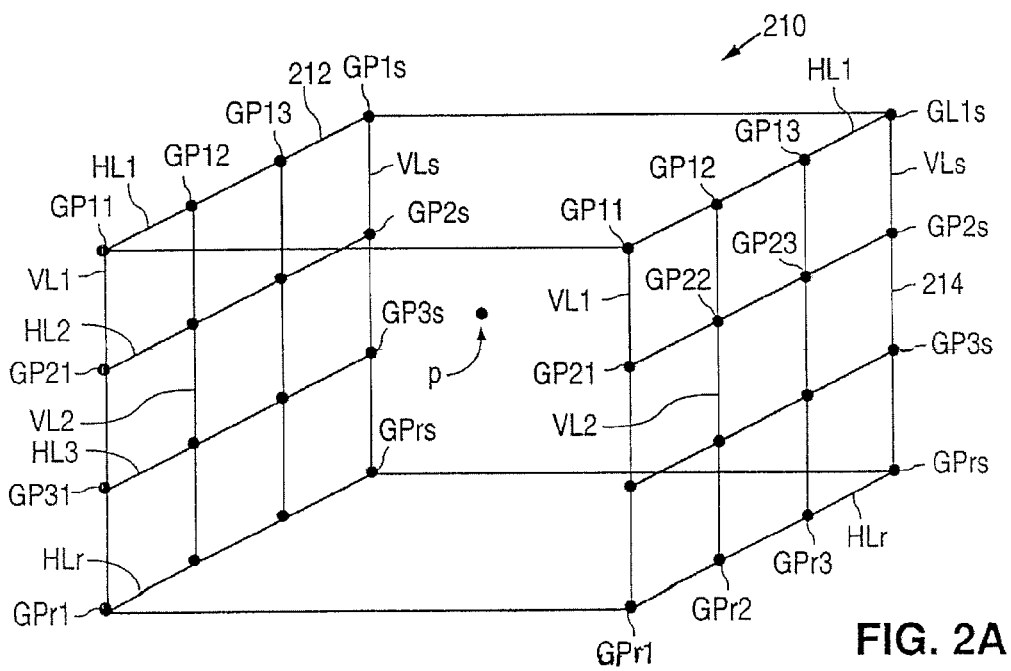
FIGS. 2A-2B are diagrams illustrating examples of defined regions of 3D space in accordance with the present invention.
Figure 2B:
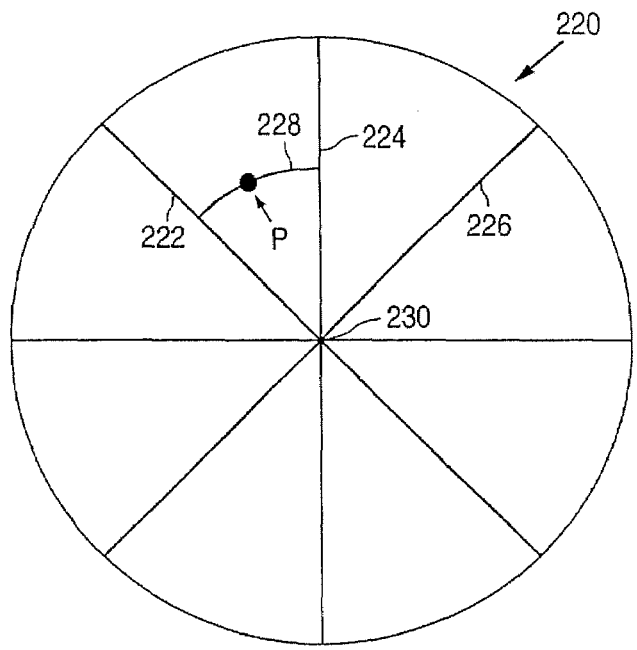

FIGS. 2A-2B show diagrams that illustrate examples of defined regions of 3D space in accordance with the present invention. As shown in the perspective view of FIG. 2A, a rectangular region of 3D space 210 can be defined by a first 2D grid 212 and a second 2D grid 214. Grids 212 and 214 both have a series of horizontal lines HL1-HLr, and a series of vertical lines VL1-VLs that are perpendicularly connected to the series of horizontal lines HL1-HLr.

In addition, grids 212 and 214 both have a series of grid points GP11-GP1s through GPr1-GPrs such that a grid point GP is defined at each intersection of a horizontal line HL and a vertical line VL. Although grids 212 and 214 are shown as having the same size, grids 212 and 214 can alternately have different sizes with different numbers of grid points.

As shown in the plane view of FIG. 282B, a cylindrical region of 3D space 220 can be defined by a first 2D grid 222, a second 2D grid 224, and a third 2D grid 226. Although FIG. 2B utilizes three 2D grids to define cylindrical region of 3D space 220, different numbers of grids can also be used to define cylindrical region of 3D space 220, different numbers of grids can also be used to define cylindrical regions of 3D space 220. In addition, grids 222, 224, and 226 can have the same or different sizes.

Returning to FIG. 1, after a region of 3D space has been defined by the 2D grids, method 100 moves to step 118 to advect elements through the region of 3D space. Any elements can be advected through the region of 3D space. For example, particles or density can be advected through the region of 3D space.

Figure 3:
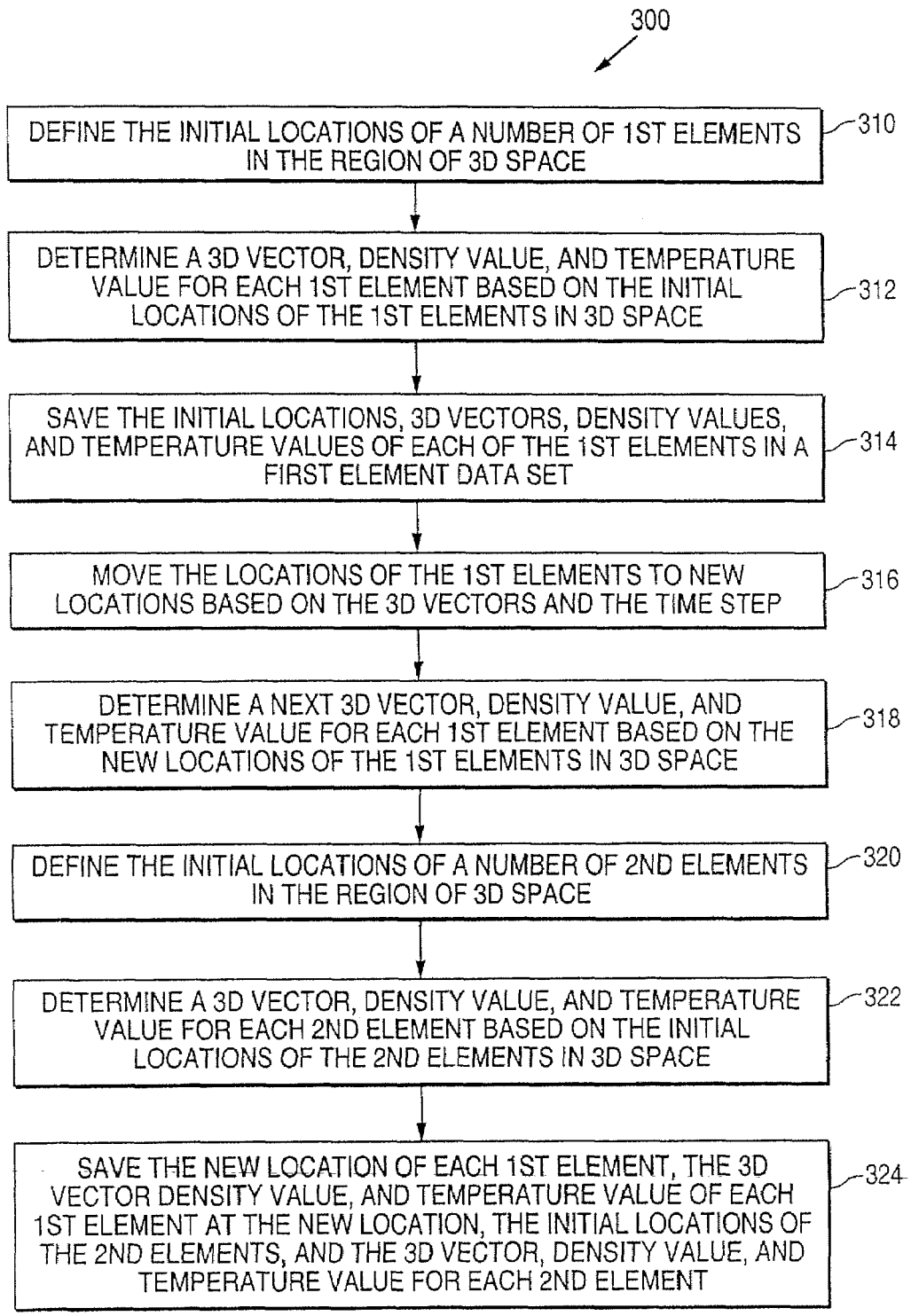
FIG. 3 is a flow chart illustrating an example of a method 3D0 of advecting elements through the region of 3D space in accordance with the present invention.

FIG. 3 shows a flow chart that illustrates an example of a method 300 of advecting elements through the region of 3D space in accordance with the present invention. As shown in FIG. 3, method 300 begins at step 310 by defining the initial locations of a number of first elements in the region of 3D space. Following this, method 300 moves to step 312 where method 300 determines a 3D vector, a density value, and a temperature value for each first element based on the initial locations of the first elements in the region of 3D space.

Figure 4:
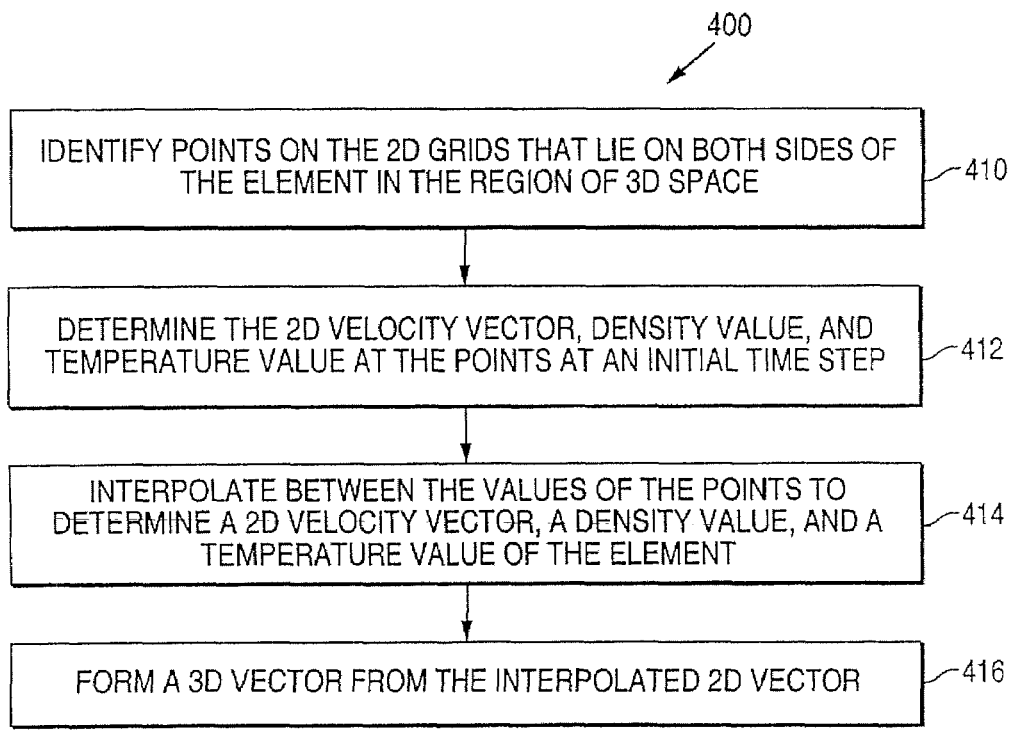
FIG. 4 is a flow chart illustrating an example of a method 400 of determining the 3D vector, the density value, and the temperature value of an element based on the location of the element in a region of 3D space in accordance with the present invention.

FIG. 4 shows a flow chart that illustrates an example of a method 400 of determining the 3D vector, the density value, and the temperature value of an element based on the location of the element in a region of 3D space in accordance with the present invention. As shown in FIG. 4, method 400 begins at step 410 by identifying points on the 2D grids that lie on both sides of the element in the region of 3D space. For example, the points on the 2D grids that are the closest to the element can be used.

After the points on the 2D grids that lie on both sides of the element have been identified, method 400 moves to step 412 to determine the 2D velocity vectors, density values, and temperature values at the points at an initial time step. As noted above, the 2D velocity vectors and density values associated with the grid points of each 2D grid incrementally change at each time step over the time period.

For example, if the closest points are used, the 2D velocity vector, density value, and temperature value at the closest point on the grid that lies on one side of the element is determined, and then the 2D velocity vector, density value, and temperature value at the closest point on the 2D grid that lies on the other side of the element is determined.

Following this, method 400 moves to step 414 to interpolate between the values of the points to determine a 2D velocity vector, a density value, and a temperature value for the element. Any type of interpolation can be used. (The axisymmetric Navier Stokes equations can also be used, but are unnecessary since a number of lower dimensional calculations are required either way to provide a degree of variance from one grid to the next.)

An example of linearly interpolating between the values of the closest points in a rectangular region of 3D space is illustrated in FIG. 2A. In this example, assume that an element P lies in the region of 3D space 210 at a point midway between first grid 212 and second grid 214. Further assume that the closest point on first grid 212 is grid point GP22, and the closest point on second grid 214 is also grid point GP22.

Additionally assume that the 2D velocity vector of grid point GP22 of grid 212 is equal to X=2, Y=2, the density value is equal to one (D=11), and temperature value is equal to 25° C. Further assume that the 2D velocity vector of grid point GP22 of grid 214 is equal to X=−2, Y=2, the density is equal to zero (D=0), and temperature value is equal to 25° C.

In this case, the 2D velocity vector of the element P is equal to X=0, Y=2, the density value of element P is equal to 0.5, and the temperature value of element P is equal to 25° C. In general, the closest points will not lie exactly on 2D grid points. As a result, linear interpolation can be used to find an appropriate value for the closest points that do not lie exactly on a 2D grid point.

An example of linearly interpolating between the values of the closest points in a cylindrical region of 3D space is illustrated in FIG. 2B. In this example, assume that an element P lies in the cylindrical region of 3D space 22D at a point midway between first grid 222 and second grid 224 along an arc 228 of constant radius from the vertical axis 230. (In this example, first and second grids 222 and 224 are the same as grids 212 and 214.)

Additionally assume that the closest point on arc 228 on grid 222 is grid point GP33, and the closest point on arc 228 on grid 224 is also grid point GP33. Further assume that the 2D velocity vector at grid point GP33 of grid 232 is equal to r=4, θ=45°, z=2, the density is equal to one (D=1), and temperature value is equal to 25° C.

Additionally assume that the 2D velocity vector at grid point GP33 of grid 234 is equal to r=4, θ=−45°, z=2, the density is equal to zero (D=0), and temperature value is equal to 25° C. In this example, using linear interpolation, the 2D velocity vector of element P is equal to r=4, θ=0°, z=2, the density value of element P is equal to 0.5, and the temperature value of element P is equal to 25° C. (Although linear interpolation has been described in these examples, any type of interpolation can be used as noted above.)

One of the advantages of using cylindrical coordinates is that cylindrical coordinates are especially useful for phenomena that have approximate axial symmetry. For example, to generate a 3D smoke plume, a number of similar (but slightly different) 2D grids that represent smoke plume are formed. Next, as shown in FIG. 2B, each grid is cut in half, and connected together in a circle at varying θ locations.

Returning to FIG. 4, after a 2D velocity vector, a density value, and a temperature value for the element has been determined by interpolating between the values at the points on the 2D grids that lie on both sides of the element, method 400 moves to step 416 to form a 3D vector from the interpolated 2D vector. For example, the interpolated vector can be converted into a 3D vector by adding a z component and setting the z component to zero.

When the z components of the 3D vectors are set to zero, it is desirable to add a pseudo-random 3D vector (with a non-zero z component) to each 3D vector in step 416 to form a non-symmetric 3D vector for each element. One way to generate a pseudo-random 3D vector for each element is to use a turbulence model, such as a Komolgorov spectrum.

A Komolgorov spectrum, which can be formed as described by Stam, J. and Flume, E., *Turbulent Wind Fields for Gaseous Phenomena*, In Proceedings of SIGGRAPH 1993, ACM Press/ACM SIGGRAPH, Computer Graphics Proceedings, Annual Conference Series, ACM, 1993, pp. 369-376 which is hereby incorporated by reference, is a way of generating a 3D velocity field that is pseudo-random but yet satisfies the incompressibility requirements of EQ. 1.

As a result, a Komolgorov spectrum represents a velocity field that a fluid could possess. It is a physically plausible 3D turbulence. When a small amount of the 3D turbulence is added to the 3D velocity vectors that are obtained from the 2D data, the 3D turbulence breaks up the 2D data a little bit to break up the artifacts that are typically seen following the interpolation.

In the case of a smoke plume, the resulting image will look very smooth and regular if only the 2D data are used to generate the 3D vectors. Thus, when the velocities of the elements are computed, instead of just using the interpolated velocity, another component is also added in. In this example, the other component is a random velocity from a random turbulence field.

As a result, instead of everything moving perfectly with the 2D grids, the random velocity vector perturbs the particles a little bit as the particles flow around, but the random velocity vector perturbs them in a way that is consistent with fluid dynamics. (Other 3D components can also be added in to further perturb the particles.) One advantage of this approach is that it does not trigger a reaction in the viewer that the look of the image is not physical, or a result of adding random noise on top of particles.

The Komolgorov technique is similar to the Phillips spectrum techniques used by Tessendorf, J., *Simulating Ocean Water*, In simulating Nature: Realistic and Interactive Techniques, SIGGRAPH 2002, Course Notes 9, 2002, to simulate water waves on an ocean. (In addition, there are a wide variety of different models in the turbulence literature.) To form a Komolgorov spectrum, random numbers are used to construct an energy spectrum in Fourier space. For example, a Komolgorov energy spectrum is described by EQ. 3:

$$P_h(k) = \begin{cases} 0 \\ 1.5\varepsilon^{2/3}k^{5/3} & \text{otherwise} \end{cases} \quad k < k_{inertial} \qquad \text{EQ.3}$$

where energy introduced at frequency $k_{inertial}$ is propagated to higher frequencies at a constant rate $\varepsilon$.

Instead of adding random numbers spatially, random numbers are added in the frequency domain to generate turbulence in a specified band of frequencies. On the frequency domain, the incompressibility equation is solved in the frequency domain, and then converted back to the spatial domain.

For example, an inverse fast Fourier transform (FFT) with a divergence free condition can be utilized to obtain a velocity field full of small scale eddies that subsequently determines the structure of the velocity field. So it generates random frequency distributions, but it generates a velocity field spatially that is something that could actually happen in fluid dynamics. This is better than adding random numbers to the particles because this is adding intelligent random numbers to the particles.

The pseudo-random velocity field is periodic. As a result, a single grid can be used to tile all space. Multiple grids of different sizes can be utilized to increase the period of repetition to the least common multiple of their lengths, thereby alleviating Visually troublesome spatial repetition (this is a minor point in the present invention since the random vector information is added to the existing vector information).

In practice, two spectrums are usually enough, alternating between the spectrums every 24 time steps. At any point in time and space, the total velocity field is defined as a linear combination of the Komolgorov field, the wind field, such as the wind field constructed from the 2D fluid dynamics simulations, and any other 3D field components that have been added.

Returning to FIG. 3, after a 3D vector, a density value, and a temperature value have been determined for each first element based on the initial locations of the first elements in the region of 3D space, method 300 moves to step 314 to save the initial locations in 3D space, 3D vectors, density values, and temperatures of each of the first elements in a first element data set.

After this, method 300 moves to step 316 where method 300 moves each first element through the region of 3D space using $\chi_t$=u where $\chi$ is the element position, t is a time step, and u is the velocity of the element. In other words, method 300 moves the locations of the first elements to new locations based on the 3D vectors of the first elements and the time step.

Once the new location for each first element has been determined, method 300 moves to step 318 where method 300 determines a next 3D vector, a density value, and a temperature value for each first element based on the new locations of the first elements in the region of 3D space.

Figure 5:
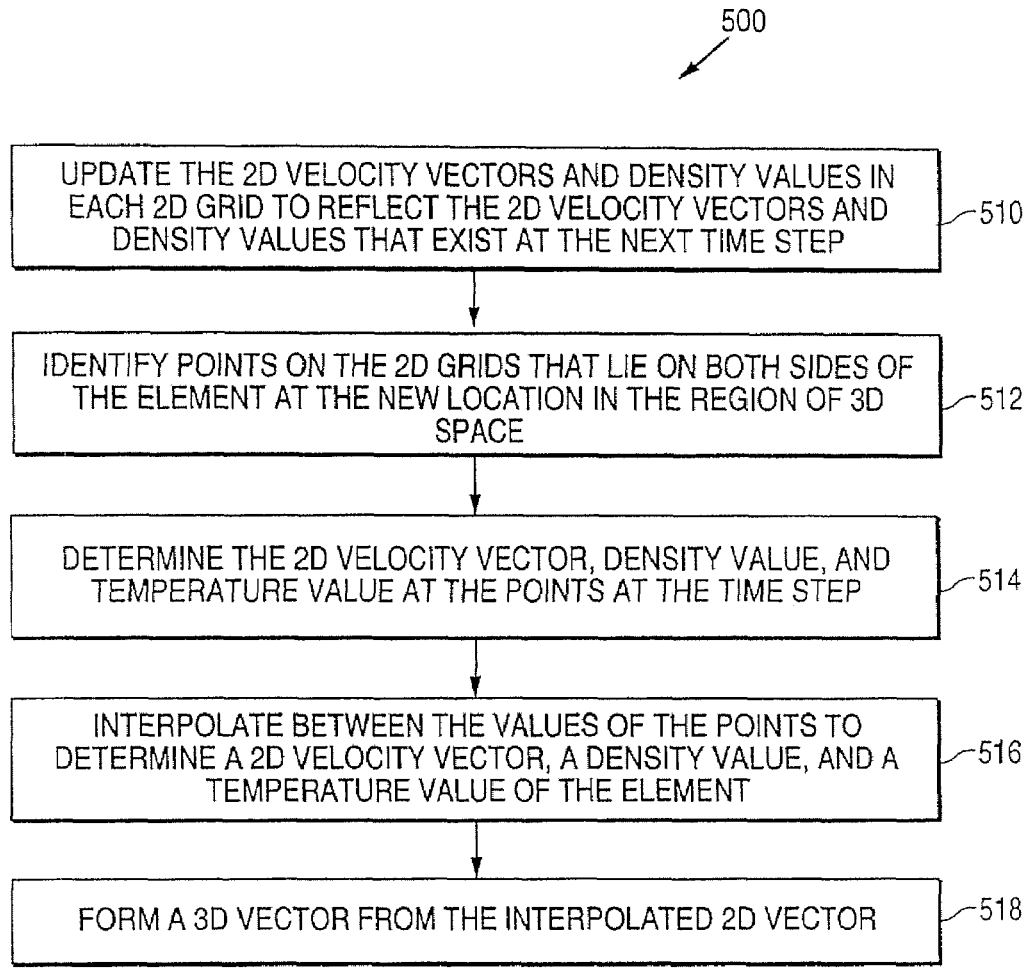
FIG. 5 is a flow chart illustrating an example of a method 500 of determining the 3D vector, the density value, and the temperature value of an element based on the new locations of the element in a region of 3D space in accordance with the present invention.

FIG. 5 shows a flow chart that illustrates an example of a method 500 of determining the 3D vector, the density value, and the temperature value of an element based on the new locations of the element in a region of 3D space in accordance with the present invention.

As shown in FIG. 5, method 500 begins at step 510 by updating the 2D velocity vectors and density values in each 2D grid to reflect the 2D velocity vectors and density values that exist at the next time step. As noted above, the 2D velocity vectors and density values associated with the grid points of each 2D grid incrementally change at each time step over the time period.

Following this, method 500 moves to step 512 to identify points on the 2D grids that lie on both sides of the element at the new location in the region of 3D space. As above, the points on the 2D grids that are the closest to the element can be used. After the points on the 2D grids that lie on both sides of the element have been identified, method 500 moves to step 514 to determine the 2D velocity vectors, density values, and temperature values at the points.

Next, method 500 moves to step 516 to interpolate between the values of the points to determine a 2D velocity vector, a density value, and a temperature value for the element at the new location in 3D space. After a 2D velocity vector, a density value, and a temperature value for the element has been determined by interpolating between the values at the points on the 2D grids that lie on both sides of the element, method 500 moves to step 518 to form a 3D vector from the interpolated 2D vector.

Returning to FIG. 3, once method 300 determines a 3D vector, density value, and temperature value for the first elements based on the new locations of the first elements in the region of 3D space, method 300 moves to step 322 to define the initial locations of a number of second elements in the region of 3D space.

Following this, method 300 moves to step 322 where method 300 determines a 3D vector, a density value, and a temperature value for each second element based on the initial locations of the second elements in the region of 3D space. The process is the same as that used with the first elements except that the 2D grids at the updated time step are used.

Once the second 3D vector, the density value, and the temperature value for each second element has been determined, method 300 moves to step 324 to save the new location of each first element, the 3D vector, density value, and temperature value of each first element at the new location, the initial locations of the second elements in 3D space, and the 3D vector, density value, and temperature value for each second element in a second element data set.

Method 300 continues to move the existing elements for each of the remaining time steps, and moves elements which have been added at a time step for the remainder of the time steps as described above. Thus, at the end of the time period, a series of element data sets have been generated where each element data set corresponds with a time step and identifies the positions, densities, and temperatures of the elements within the region of 3D space.

The number of time steps corresponds with a number of frames or images that are to be projected or displayed in a special effects sequence. Each time step represents a frame period which, in turn, is the time that elapses between frames. The series of element data sets corresponds with the series of frames so that an element data set corresponds with each frame.

Figure 6:
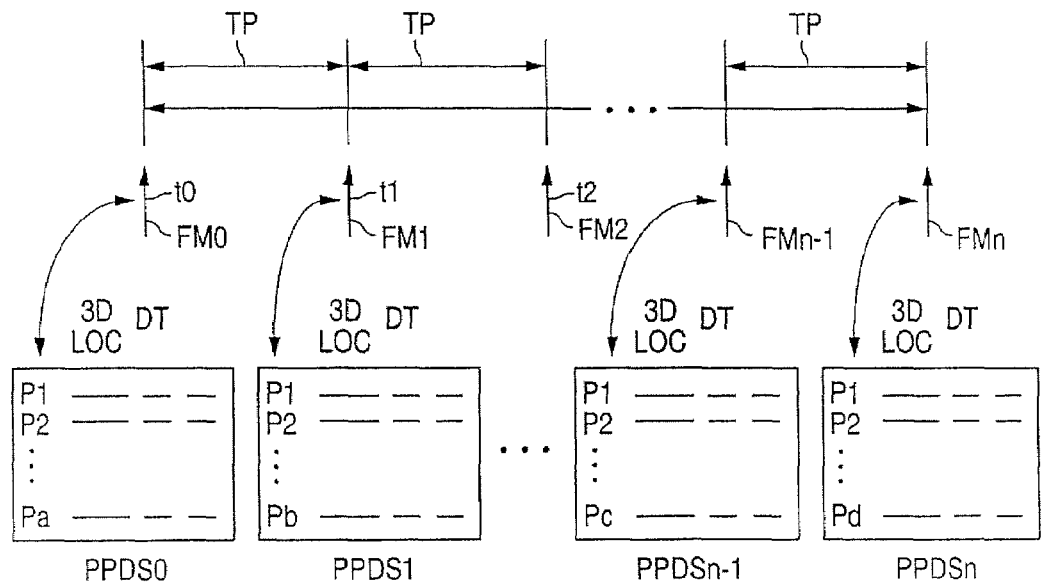
FIG. 6 is a timing diagram illustrating an example of the relationship between frames and element data sets in accordance with the present invention.

FIG. 6 shows a timing diagram that illustrates an example of the relationship between frames and element data sets in accordance with the present invention. As shown in FIG. 6, a series of frames FM0-FMn are defined where each adjacent pair of frames FM is separated by a frame period TP. Thus, frame FM0 is projected or displayed at time t0, and frame FM1 is projected or displayed at time t1, where the frame period TP=t1−t0. Similarly, frame FM2 is projected or displayed at time t2, where the frame period TP=t2−t1.

As further shown in FIG. 6, a series of element data sets PPDS0-PPDSn are generated so that an element data set corresponds with each frame FM. The element data sets PPDS0, PPDS1, PPDSn−1, and PPDSn list the elements P1-Pa, P1-Pb, P1-Pc, and P1-Pd, respectively, that lie in the region of 3D space at frames FM0, FM1, FMn−1, and FMn, respectively, along with the 3D location (3D LOC), density D, and temperature T of each element P.

As indicated by the reference labels and as described above, differing numbers of elements can be present in each element data set PPDS. For example, to view large-scale phenomena, such as a nuclear explosion, new elements P can be injected into the region of 3D space at each time step (frame FM). In this case, the sizes of the element data sets PPDS increase with time.

Returning to FIG. 1, after an element data set PPDS has been generated for each frame FM, where each element data set PPDS defines the 3D location, density, and temperature of each element that lies in the region of 3D space at a frame FM, method 100 moves to step 12D to render the elements in the element data sets PPDS (convert the element information into a visual form).

The elements in the element data sets PPDS are rendered by first sampling the densities of the elements in each element data set PPDS onto a voxel grid. A turbulence function can be used to modulate the density function to add extra detail as described in Perlin, K., *An Image Synthesizer*, In Proceedings of SIGGRAPH 1985, ACM Press/ACM SIGGRAPH, Computer Graphics Proceedings, Annual Conference Series, ACM, 1985, pp. 287-296. The sampled particle density is then stored in the voxel grid.

After the element densities have been sampled onto a voxel grid, the total radiance at each voxel is calculated and stored. Thus, in addition to the element densities, the voxel grid also stores the total radiance (the sum of direct illumination, incandescence, and scattered light).

After the total radiance at each voxel has been calculated and stored, the volume is rendered by tracing rays from a camera through the voxel grid. As the rays are traced through the voxel grid, opacity and color are accumulated. Opacity increases as the distance of voxel from the camera increases. Opacity accumulation can be terminated as soon as full opacity (>0.999) is reached, and this happens relatively early for many of the phenomena of interest.

Figure 7:
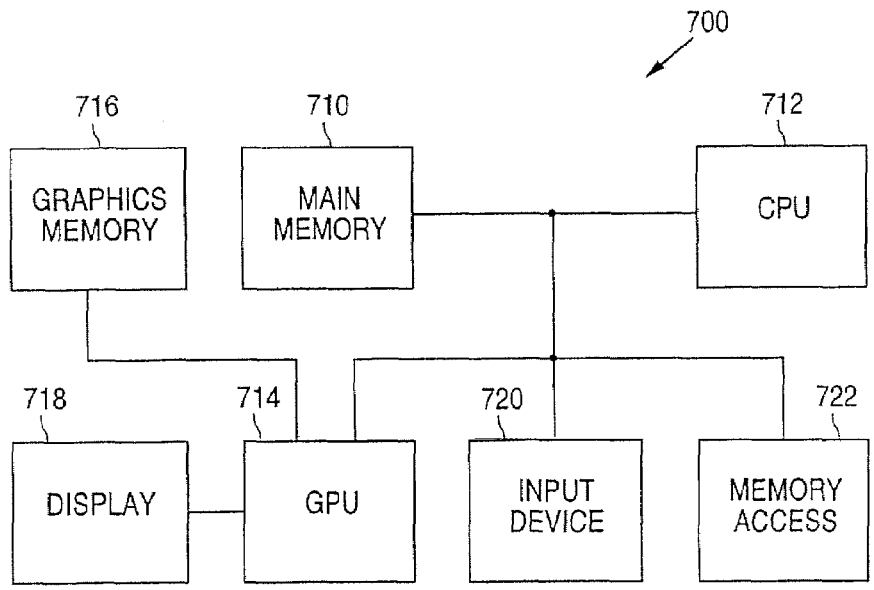
FIG. 7 is a block diagram illustrating an example of a computer 700 in accordance with the present invention.

FIG. 7 shows a block diagram that illustrates an example of a computer 700 in accordance with the present invention. Computer 700, which can be implemented with, for example, a Pentium4 2.2 GHz or comparable machine, executes software that implements the methods of the present invention. As shown in FIG. 7, computer 700 includes a main memory 710 that stores the software and data.

The software includes an operating system and a set of program instructions. The operating system can be implemented with, for example, the Linux operating system, although other operating systems can alternately be used. The program instructions can be written in, for example, C++ although other languages can alternately be used.

Further, computer 700 includes a central processing unit (CPU) 712 that is connected to memory 710. CPU 712, which can be implemented with, for example, a 32-bit processor, operates on the data in response to the program instructions. Although only one processor is described, the present invention can be implemented with multiple processors in parallel to increase the capacity to process large amounts of data.

In addition, computer 700 includes a graphics processor unit (GPU) 714 that is connected to CPU 712, a graphics memory 716 that is connected to GPU 714, and a display system 718 that is connected to GPU 714. GPU 714 functions as a rendering processor, receiving polygonal data from CPU 712, computing pixel data from the polygonal data, and writing the pixel data into graphics memory 716. GPU 714 also reads out the pixel data that has been written into graphics memory 716, and generates a digital or analog video signal that is output to display system 718. Display system 718, in turn, displays images that are defined by the pixel data.

Computer 700 also includes a user-input system 720, such as a keyboard and a mouse, which is connected to CPU 712. In put system 720, which can be remotely located, allows the user to interact with the program. Further, computer 700 includes a memory access device 722, such as a disk drive or a networking card, which is connected to memory 710 and CPU 712. Memory access device 722 allows the processed data from memory 710 or CPU 712 to be transferred to an external medium, such as a disk or a networked computer. In addition, device 722 allows the program instructions to be transferred to memory 710 from the external medium.

If desired, copies of 2D velocity fields and the 3D Komolgorov velocity field can be distributed to multiple machines where particles can be passively evolved with no intercommunication requirements. This allows an incredibly large number of particles to be generated, although even one processor can generate enough particles to move the bottleneck to the rendering stage.

There are many advantages to using particles to represent the flow field. For example, the results of a calculation can be rapidly visualized by drawing points at every particle location. In addition, density and temperature fields can be interpolated from the 2D grids to the particle locations and stored there for subsequent rendering. In addition, both an orientation and an angular velocity can be evolved with each particle to provide additional information for the rendering stage, such as an evolving coordinate system as described in Szeliski, R. and Tonnesen, D., *Surface Modeling with Oriented Particle Systems*, Computer Graphics (SIGGRAPH Proc.), 1992, pp. 185-194 which is hereby incorporated by reference.

The 2D wind fields, such as the fields formed from the computation fluid dynamics (CND) solution, and the Komolgorov velocity field can be pre-computed rather quickly (just a few seconds per frame). As a result, the computations of the 3D velocities happens on the fly per element based on the position of the element. The Komolgorov spectrum could be precomputed, but in this case it is generated on the fly when the element invection process is started because it is relatively inexpensive to compute.

Experimental results where a few million elements were advected through a velocity field constructed from 2D 250× 250 grid cell simulations and a 128×128 Komolgorov grid required simulation times of a few seconds per frame for both the 2D simulations and the Komolgorov spectrum, but the element advection required an average time of about two minutes per frame when as many as six million elements were used.

When the resolution of the 2D simulations were increased to about 500×500 grid cells, simulation times of less than 10 seconds per frame were required. When the resolution of the 2D simulations were increased to about 2000×2000 grid cells, simulation times of about 2 minutes were required. Both the size of the Komolgorov grid and the number of elements in the 250, 500, and 2D00 simulations were approximately the same. (These simulations used one radially interpolated set of velocity fields for a large plume (the mushroom cap of a nuclear explosion), and another for the ground elements. Rendering times for all simulations ranged from five to ten minutes per frame.

Thus, the present invention provides a method of integrating non-interacting elements forward in time using a wind field that does not require a large 3D grid for its representation. Instead a more realistic and detailed velocity field is derived from a number of 2D fields, such as fluid dynamics situations, that can be carried out efficiently even for high levels of detail.

As a result, to obtain results on a scale of 2000×2000× 2000, only a few 2000×2000 grids need to be simulated, thereby saving a factor of 2000 in both simulation time and memory. This reduces the amount of memory to around 60 MB without sacrificing detail. The positions of the elements still needs to be stored, but only those at an optical depth that the renderer can "see", i.e., since the elements do not interact, the elements deep inside (or behind) a plume are not needed. In addition, a periodic spatial tiling of a 3D Komolgorov spectrum has been used to add more 3D effects to the simulation, and this requires another 24 MB of memory.

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. A computer-implemented method comprising:
   defining a region of three-dimensional space from a combination of at least two two-dimensional grids, wherein each two-dimensional grid represents a two-dimensional simulation and includes a plurality of grid points, each grid point is assigned adjustable two-dimensional simulation information;
   defining an element within the three-dimensional space, wherein adjustable three-dimensional simulation information is assigned to the element as determined by interpolating the adjustable two-dimensional simulation information of at least one grid point from at least one of the two-dimensional grids; and
   rendering simulated advection through the three-dimensional space by using the adjustable three-dimensional simulation information of the element.

2. The computer-implemented method of claim 1, wherein defining the element within the three-dimensional space includes identifying at least one grid point from at least one of the two-dimensional grids that is adjacent to the element.

3. The computer-implemented method of claim 2, wherein the adjacent grid point is nearest to the element.

4. The computer-implemented method of claim 1, wherein interpolating the adjustable simulation information includes linear interpolation.

5. The computer-implemented method of claim 1, wherein each of the at least two two-dimensional grids includes an equivalent number of grid points.

6. The computer-implemented method of claim 1, wherein each of the at least two two-dimensional grids includes a different number of grid points.

7. The computer-implemented method of claim 1, wherein the adjustable three-dimensional simulation information assigned to the element includes an additional component.

8. The computer-implemented method of claim 7, wherein the additional component represents a pseudo-random 3D vector.

9. The computer-implemented method of claim 1, wherein the adjustable three-dimensional simulation information includes movement information.

10. The computer-implemented method of claim 1, wherein the adjustable three-dimensional simulation information includes density information.

11. A computer program product, encoded on a computer-readable medium, operable to cause data processing apparatus to perform operations comprising:
    defining a region of three-dimensional space from a combination of at least two two-dimensional grids, wherein each two-dimensional grid represents a two-dimensional simulation and includes a plurality of grid points, each grid point is assigned adjustable two-dimensional simulation information;
    defining an element within the three-dimensional space, wherein adjustable three-dimensional simulation information is assigned to the element as determined by interpolating the adjustable two-dimensional simulation information of at least one grid point from at least one of the two-dimensional grids; and
    rendering simulated advection through the three-dimensional space by using the adjustable three-dimensional simulation information of the element.

12. The computer program product of claim 11, wherein defining the element within the three-dimensional space includes identifying at least one grid point from at least one of the two-dimensional grids that is adjacent to the element.

13. The computer program product of claim 12, wherein the adjacent grid point is nearest to the element.

14. The computer program product of claim 11, wherein interpolating the adjustable simulation information includes linear interpolation.

15. The computer program product of claim 11, wherein each of the at least two two-dimensional grids includes an equivalent number of grid points.

16. The computer program product of claim 11, wherein each of the at least two two-dimensional grids includes a different number of grid points.

17. The computer program product of claim 11, wherein the adjustable three-dimensional simulation information assigned to the element includes an additional component.

18. The computer program product of claim 17, wherein the additional component represents a pseudo-random 3D vector.

19. The computer program product of claim 11, wherein the adjustable three-dimensional simulation information includes movement information.

20. The computer program product of claim 11, wherein the adjustable three-dimensional simulation information includes density information.

21. A computer system comprising:
    a processor for executing instructions;
    a memory storing instructions that when executed by the processor perform operations comprising:
      defining a region of three-dimensional space from a combination of at least two two-dimensional grids, wherein each two-dimensional grid represents a two-dimensional simulation and includes a plurality of grid points, each grid point is assigned adjustable simulation information, and
      defining an element within the three-dimensional space, wherein adjustable three-dimensional simulation information is assigned to the element as determined by interpolating the adjustable two-dimensional simulation information of at least one grid point from at least one of the two-dimensional grids; and
    a display for rendering simulated advection through the three-dimensional space by using the adjustable three-dimensional simulation information of the element.

22. The computer system of claim 21, wherein defining the element within the three-dimensional space includes identifying at least one grid point from at least one of the two-dimensional grids that is adjacent to the element.

23. The computer system of claim 22, wherein the adjacent grid point is nearest to the element.

24. The computer system of claim 21, wherein interpolating the adjustable simulation information includes linear interpolation.

25. The computer system of claim 21, wherein each of the at least two two-dimensional grids includes an equivalent number of grid points.

26. The computer system of claim 21, wherein each of the at least two two-dimensional grids includes a different number of grid points.

27. The computer system of claim 21, wherein the adjustable three-dimensional simulation information assigned to the element includes an additional component.

28. The computer system of claim 27, wherein the additional component represents a pseudo-random 3D vector.

29. The computer system of claim 21, wherein the adjustable three-dimensional simulation information includes movement information.

30. The computer system of claim 21, wherein the adjustable three-dimensional simulation information includes density information.

* * * * *

UNITED STATES PATENT AND TRADEMARK OFFICE
CERTIFICATE OF CORRECTION

PATENT NO. : 7,747,420 B1  Page 1 of 1
APPLICATION NO. : 12/277607
DATED : June 29, 2010
INVENTOR(S) : Nicholas Grant Rasmussen et al.

It is certified that error appears in the above-identified patent and that said Letters Patent is hereby corrected as shown below:

Title page, Col. 2 (Other Publications), Item 56, Line 11, Delete "Springer-Verglag" and insert -- Springer-Verlag, --

Signed and Sealed this

Thirtieth Day of November, 2010

David J. Kappos
*Director of the United States Patent and Trademark Office*